United States Patent
Wennberg

(10) Patent No.: US 7,261,549 B2
(45) Date of Patent: Aug. 28, 2007

(54) DEVICE AND A METHOD FOR REMOVING AN OBJECT FROM A MOULDING TOOL

(76) Inventor: Mikael Wennberg, Skultunavagen 32, SE-722 17, Vasteras (SE)

(*) Notice: Subject to any disclaimer, the term of this patent is extended or adjusted under 35 U.S.C. 154(b) by 0 days.

(21) Appl. No.: 10/531,593

(22) PCT Filed: Oct. 17, 2002

(86) PCT No.: PCT/SE03/01590

§ 371 (c)(1),
(2), (4) Date: Apr. 17, 2005

(87) PCT Pub. No.: WO2004/035286

PCT Pub. Date: Apr. 29, 2004

(65) Prior Publication Data

US 2006/0034968 A1 Feb. 16, 2006

(30) Foreign Application Priority Data

Oct. 17, 2002 (SE) .................................... 0203075

(51) Int. Cl.
*B29C 45/42* (2006.01)

(52) U.S. Cl. ................ 425/444; 425/437; 425/436 RM

(58) Field of Classification Search ................ 425/444, 425/436 RM, 130, 437
See application file for complete search history.

(56) References Cited

U.S. PATENT DOCUMENTS

| 4,571,320 | A | * | 2/1986 | Walker ....................... 264/40.1 |
| 4,604,026 | A | * | 8/1986 | Barrett ........................ 414/728 |
| 5,112,558 | A | * | 5/1992 | Schad et al. ............. 264/297.2 |
| 5,304,050 | A | * | 4/1994 | Vismara ...................... 425/4 R |
| 5,935,511 | A | * | 8/1999 | Brown ........................ 264/551 |
| 6,325,955 | B1 | * | 12/2001 | Herbst ........................ 264/40.5 |
| 6,485,285 | B1 | * | 11/2002 | Shiotani ...................... 425/139 |

FOREIGN PATENT DOCUMENTS

| DE | 10219276.6 | * | 4/2002 |
| GB | 2010731 A | * | 7/1979 |

* cited by examiner

*Primary Examiner*—Yogendra N. Gupta
*Assistant Examiner*—Emmanuel S. Luk
(74) *Attorney, Agent, or Firm*—Robert S. Smith

(57) ABSTRACT

A device (1) and a method for removing an object from a moulding tool (2) in connection with casting or moulding an object, wherein there is a retaining force between the moulding tool and the object. The device comprises a body (5), coupling means (13) arranged for coupling the object to the body and means (20) for applying a traction force on the object, which is substantially opposite to said retaining force, wherein the body is designed with a contact surface adapted for at least partly being in contact with the object, and the coupling means is arranged to couple the object to the contact surfaces such that said traction force becomes substantially uniformly distributed over the part of the surface of the object that is in contact with the contact surface.

10 Claims, 2 Drawing Sheets

DEVICE AND A METHOD FOR REMOVING AN OBJECT FROM A MOULDING TOOL

CROSS REFERENCE TO RELATED APPLICATION

This is the United States national phase of International Application No. PCT/SE2003/001590, filed 17 Oct. 2002.

BACKGROUND OF THE INVENTION

1. Technical Area

The present invention relates to a device and a method for removing an object from a moulding tool in connection with casting or moulding an object, wherein there is a retaining force between the moulding tool and the object.

Such a device may be used for removing objects in connection with different kinds of moulding and casting processes, for example injection moulding, vacuum forming, thermoforming, compression moulding, or blow moulding.

2. Prior Art

There are many known methods for forming an object. One category of forming methods have in common that they are based on a work-piece, which is heated until it becomes formable and is then formed by pressing the work-piece against a moulding tool having a surface of a shape, which determines the shape of the object to be formed. The work-piece is usually a sheet or a tube of plastic that is heated until it becomes soft enough to be formed. When the work-piece has reached the correct temperature, the object is formed by pressing the work-piece against a moulding tool so that the work-piece is formed after the surface of the moulding tool. Cooling of the object takes place in the moulding tool until the object is stable enough to allow to be moved for further processing. Examples of such forming methods are thermoforming, vacuum forming, compression moulding, or blow moulding.

Another method for forming objects is casting. At casting processes, the source material is heated until it melts and the object is formed by supplying a moulding tool comprising a moulding space, the shape of which corresponds to the shape of the object, with the liquid cast material. The moulding tool usually consists of two halves, wherein one side is movable and the other is fixed. The object is kept in the moulding tool until it is cool enough to allow further processing. The moulding tool is opened by moving the movable side aside and the object is picked out of the casting machine. Thereafter, the next object can be cast.

A problem in connection with casting and moulding of objects is that the object shrinks when it solidifies and gets stuck in the moulding tool. This means that, in some cases, it is necessary to use large forces to loosen the object from the moulding tool. This problem has, for example, been solved by providing the moulding tool with ejectors, for instance in the shape of pins, pushing the object and in such a way ejecting it out of the mould. To avoid deformation of the object by the ejectors, the object has to be kept in the moulding tool until it is solid enough. During casting processes producing large volumes, short cycle times are important for an optimal production and therefore it is desirable to remove the object as early as possible from the moulding tool.

It is also known with devices for moving the finished object from the moulding tool after the object has been released from the moulding tool. One such known device comprises a body provided with suction cups, which are coupled to the object. At first, the suction cups are coupled to the object and thereafter the object is released from the moulding tool by means of the ejectors. When the object is released, the device transports the object away from the moulding tool to a suitable place for further processing. Such a device cannot be used for releasing the object due to the fact that the suction cups may cause deformation of the object if it has not become entirely solidified.

OBJECT AND SUMMARY OF THE INVENTION

The object with the present invention is to provide a device assisting in releasing and removing objects from a moulding tool without causing any deformation of the object and thereby making it possible to remove the objects before they are entirely solidified.

This object is achieved by the initially mentioned device which is characterized in that it comprises a body, coupling means arranged for coupling the object to the body, and means for applying a traction force on the object, which is substantially opposite to said retaining force, wherein the body is designed with a contact surface adapted for at least partly being in contact with the object, and a coupling means is arranged to couple the object to the contact surface such that said traction force becomes substantially uniformly distributed over the part of the surface that is in contact with the contact surface. By distributing the traction force over as large a surface as possible, deformation of the surface of the object is avoided. The size and the shape of the contact surface determine how the traction power affects the device, and thereby the risk for deformation of the object. The larger the part of the surface of the object that is in contact with the contact surface is, the less the traction force per unit of area is, despite the fact that the total traction force on the object is still the same.

Thanks to the fact that the device can remove the object without substantially deforming the surface of the object, it is enough to keep the object in the moulding tool until the outer surface of the formed object is substantially form stable. Thus, it is possible to remove the object earlier and the cycle time at moulding or casting can be reduces in comparison with prior art. It is advantageous to use the device according to the invention in connection with the previously mentioned ejectors to remove the object. Thanks to the fact that the device applies a traction force on the object at the same time as the ejectors are pushing out the object, the ejectors do not necessarily have to push with as large a force as if they alone had to remove the object and thereby the risk for deformation of the object by the ejectors is reduced.

According to a preferred embodiment of the invention, the contact surface has a shape that is substantially adapted to the shape of the object. To distribute the forces over as large a part of the surface of the object as possible, it is advantageous if the contact surface has a shape that is substantially adapted to the shape of the object. It is an advantage if the contact surface has a shape that substantially is a reproduction of at least a part of the surface of any side of the formed object. The contact surface does not have to be an exact reproduction of the surface of the object; a rough reproduction it is enough. Depending on the shape of the object, the contact surface has to completely, or only partly, imitate the surface of the object. For a less complicated shape, it may be enough if the contact surface reproduces one or a few chosen parts of the object surface.

According to a further embodiment of the invention, the body comprises at least one section made of a substantially inelastic material and said section being arranged in connection to the contact surface. The body and the contact surface shall be shaped so that they form a support for the object and thereby contribute the object keeping its shape and not being deformed during the removal of the object from the moulding tool. To be able to be such a support for the object, at least the section of the body that is closest to the contact surface ought to be made of an substantially inelastic material.

According to a further embodiment of the invention, said coupling means is arranged to couple the object to the contact surface by means of under-pressure. Preferably, the coupling means is arranged so that it creates said under-pressure between the contact surface and the surface of the object. By the creation of an under-pressure between the surface of the object and the contact surface, the applied traction force becomes evenly distributed over the surface of the object.

According to a further embodiment of the invention, the coupling means comprises sealing means arranged for sealing between the contact surface and the object, and at least one coupling channel being arranged in connection to the contact surface, wherein the coupling channel is arranged for transporting air away from the contact surface.

According to a further embodiment of the invention, it comprises at least one air-permeable contact means having a surface being at least a part of the contact surface and arranged to be in contact with the object in such a way that deformation of the object is counteracted. The contact means is arranged such that air is transported away from the contact surface to the coupling channel via the contact means. It is advantageous if the contact means is made of an substantially inelastic material. With such a contact means, it is possible to create an under-pressure between the contact surface and the object without deforming the surface of the object. If the coupling channel is connected directly to the contact surface, its entrance opening may cause deformation of the surface of the object, if the suction force is too large. Thanks to the fact that the contact means is arranged between the suction opening and the coupling channel, it is possible to increase the cross-section area of the coupling channel and the suction opening, which means that the suction force on the object can be increased without leading to deformation of the surface of the object.

According to a further embodiment of the invention, the contact means comprises a plurality of elements arranged such that cavities are formed between them, wherein transportation of air is permitted through the contact means. It is advantageous if the contact means is substantially made of a sintered metal or a sintered metal alloy.

According to a further embodiment of the invention, the contact means is arranged such that transportation of air from the contact surface to the coupling channel is performed through the contact means and that said sealing means is arranged so that it surrounds the contact means. To achieve an under-pressure between the contact surface and the object without risking that the yet not stable surface layer of the object becomes deformed, air from the contact surface is transported to the coupling channel via the contact means.

According to a further embodiment of the invention, said means for applying a traction force on the object is arranged for cooperation with the moulding tool for application of the traction force on the object. This means, for example, that the ejectors of the moulding tools are used to achieve a traction force on the object.

Another object of the present invention is to achieve a method for loosening and removing objects from a moulding tool without deforming the objects. This object is achieved by a method according to claim 12.

BRIEF DESCRIPTION OF THE DRAWINGS

The present invention will now be explained more closely by the description of various embodiments of the invention and with reference to the appended figures.

DETAILED DESCRIPTION OF PREFERRED EMBODIMENTS

Figure 1:
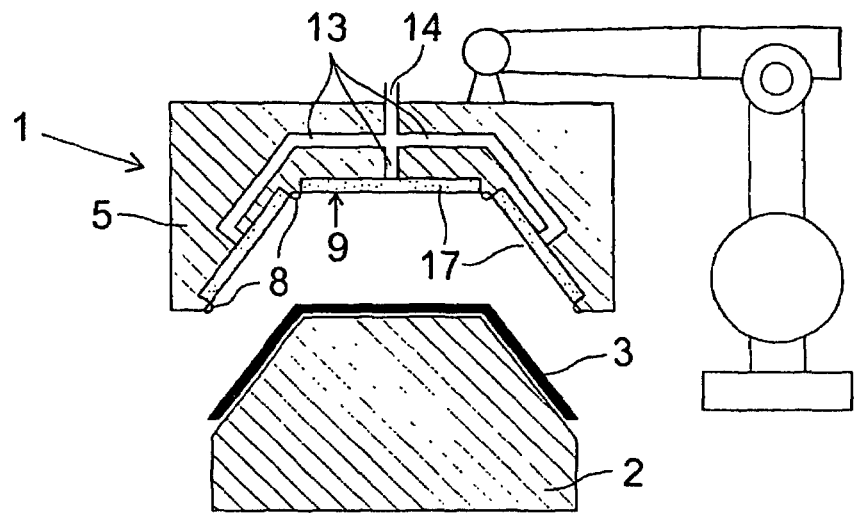
FIGS. 1-3 show a device according to a first embodiment of the invention and its use in connection with vacuum moulding.
Figure 2:
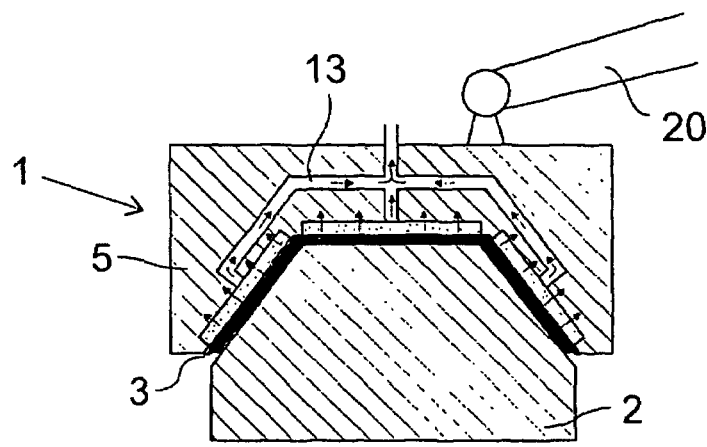
Figure 3:
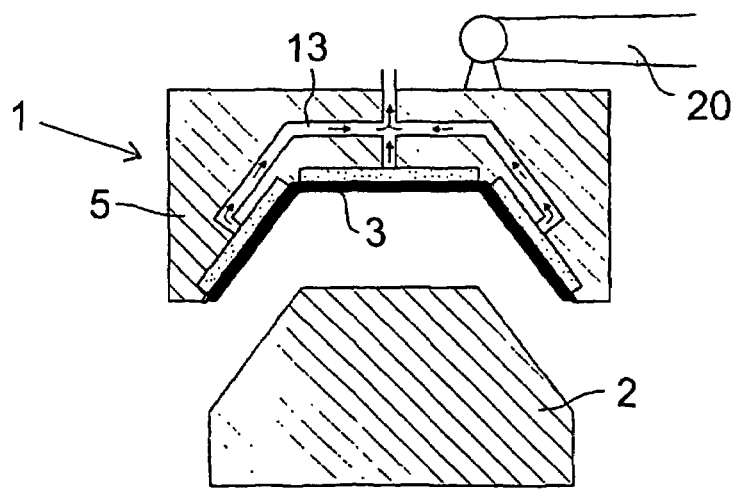

The FIGS. 1-3 show a device 1 according to the invention applied in a vacuum-moulding machine. The device 1 is arranged for removing an object from a moulding tool and then to transport the object away from the moulding tool without deforming the object. The vacuum-moulding machine comprises a moulding tool 2 having a surface, the shape of which determines the shape of the object to be mould. The source material to be mould is usually a sheet of a suitable plastic. The sheet is heated during the vacuum-moulding process so that it becomes soft and formable. When the sheet has reached the right temperature, a relative movement between the sheet and the moulding tool 2 occurs so that they get in contact with each other. Thereafter, the sheet is sucked towards the forming tool by means of under-pressure, so that the sheet is shaped after the surface of the moulding tool and the object 3 is formed. Cooling is performed in the moulding tool until the object becomes substantially form-stable. During the cooling, the object often shrinks and thereby retaining forces arise between the object and the moulding tool.

The device 1 comprises a body 5 made of a substantially inelastic material, for example hard plastic or a metal, such as aluminum, magnesium, or steel. Examples of suitable plastic materials are PON, ABS, PA, PC, PUR. The device is provided with a surface 9 adapted for at least partly being in contact with the object. The surface 9 is in the following denoted the contact surface. The shape of the contact surface 9 depends of the shape of the object to be removed from the moulding tool. In this example, the shape of the contact surface depends on the shape of the surface of the object 3, which faces away from the moulding tool 2.

The device 1 comprises coupling means arranged to couple the object to the body 5 by means of under-pressure. The coupling means comprises at least one coupling channel 13 arranged in the body 5 for transporting air away from the contact surface so that an under-pressure is created that adheres the object to the contact surface. In this embodiment, the body is provided with three coupling channels 13. The coupling channels 13 emerge into the contact surface 9 and are arranged so that they can be emptied of air, so that an under-pressure is produced in the channels. The coupling channels converge in a mutual channel 14 leading out from the body 5 and is connected to a (not shown) pump or other another piece of equipment for producing under-pressure in the channels. The coupling means is arranged so that it creates a force per surface area which is larger than 0.3 atm, or rather so that it creates a force per surface area which is larger than 0.7 atm.

At least one recess is provided in the contact surface 9. In this embodiment, the contact surface is provided with three recesses, each of which having a corresponding coupling channel 13 emerging in the recess. In each of the recesses, one air-permeable contact means 17 is arranged. In this embodiment, the contact means fills up the space in the recess completely, but in an alternative embodiment, the contact means fills up at least a part of the space. The contact means 17 is arranged between the contact surface 9 and the coupling channel 13 and is intended for transportation of air between the contact surface and the coupling channel. The contact means 17 is fastened to the recess in any known way, for example, by force fitting, gluing, soldering or welding.

The contact means 17 has an inner side turned toward the coupling channel 13 and an outer side turned outward, toward the object 3. The outer side the contact means forms a part of the contact surface 9 and has a shape depending on the shape of the object to be treated. Around the outer periphery of the recesses and thereby around the contact elements, sealing means are arranged, the purpose of which is to seal between the object and the body 5 when the air is pumped from the area between the object and the coupling channel to achieve an under-pressure in the recess. The fact that the contact means is permeable means that it is porous, i.e. it comprises air holes or hollow spaces permitting air to pass through them. For the best functioning, the hollow spaces should have an average size larger than 25 μm.

Besides transporting air away from the contact surface, the task of the contact means is to prevent deformation of the object when it is coupled to the device. For the purpose of preventing deformation of the object, the contact means is shaped so that its outer side, during removal, bears on and supports the surface of the object. To achieve this supporting function and to prevent deformation of the surface, the outer side of the contact means is adapted to the shape of the object and the contact means is made of a substantially inelastic material, for example, plastic, graphite, metal, or a metal alloy.

The contact means 17 is substantially disc-shaped and may have an arbitrary outer contour line, for example, circular or square. The height of the contact means depends on the porosity of the contact means. The lower the porosity is, the thinner the contact means has to be to achieve enough airflow through the contact means. Typically, the height of the contact means should lie within the interval 0.5-50 mm. The contact means should have an area preferably equal to, or more preferably larger than, the area of the coupling channel connected to the contact means. The size of the area depends on the porosity of the contact means. The lower porosity, the larger the area has to be to avoid that the contact means throttles the airflow.

In one embodiment example, the contact means 17 is made of sintered metal. The sintered metal comprises a plurality of metal particles melted together and between which hollow spaces are formed through which air may pass. The hollow spaces formed between the sintered particles form channels transporting air from the contact surface 9 to the coupling channels 13. In an alternative embodiment, the contact means comprises a set of elongated elements arranged parallel to each other, so that they form a three-dimensional pattern. The elongated elements are arranged so that they extend from the bottom of the recess to the contact surface 9. The surface of the upper ends of the elongated elements is adapted to bear on the object 3 and thereby supporting the object and to prevent deformation of the surface. The elongated elements are arranged at a distance from each other, so that channels are form between them, which permit transport of air through the contact means.

The device 1 comprises a handling member 20 arranged to move the device 1 to and from the moulding tool 2 and to apply a traction force on the device when it is coupled to the object to remove the object from the moulding tool. The handling member 20 is, for example, a movable arm or as shown in FIG. 1 a 6-axis industrial robot. The robot comprises arms movably arranged in relation to each other. FIG. 1 shows the device 1 on its way downward in a direction towards the object 3 to dock therewith. When moulding of the object is finished, the body 5 is docked against the object 3, so that the surface of the object bears on the contact surface 9. When the surfaces are fitted to each other, air is pumped out through the coupling channels 13, wherein the spaces between the surface of the object and the coupling channels are emptied on air. In such a way, an under-pressure is effectuated between the contact surface and the surface of the object, which under-pressure adheres the object against the contact surface by a force.

FIG. 2 shows how the object 3 is released from the moulding tool 2 by the handling member 20 applying a traction force on the device 1 in a direction away from the moulding tool. Thus, the applied traction force acts also on the object and is opposite said retaining force. The traction force is applied until the object is released from the moulding tool. Arrows in FIG. 2 show how the traction force acts on the object. When the object has been loosened from the moulding tool, the device 1 with the object 3 is taken away from the moulding tool 2 and moved to a suitable place outside the moulding machine for further processing as shown in FIG. 3.

Figure 4:
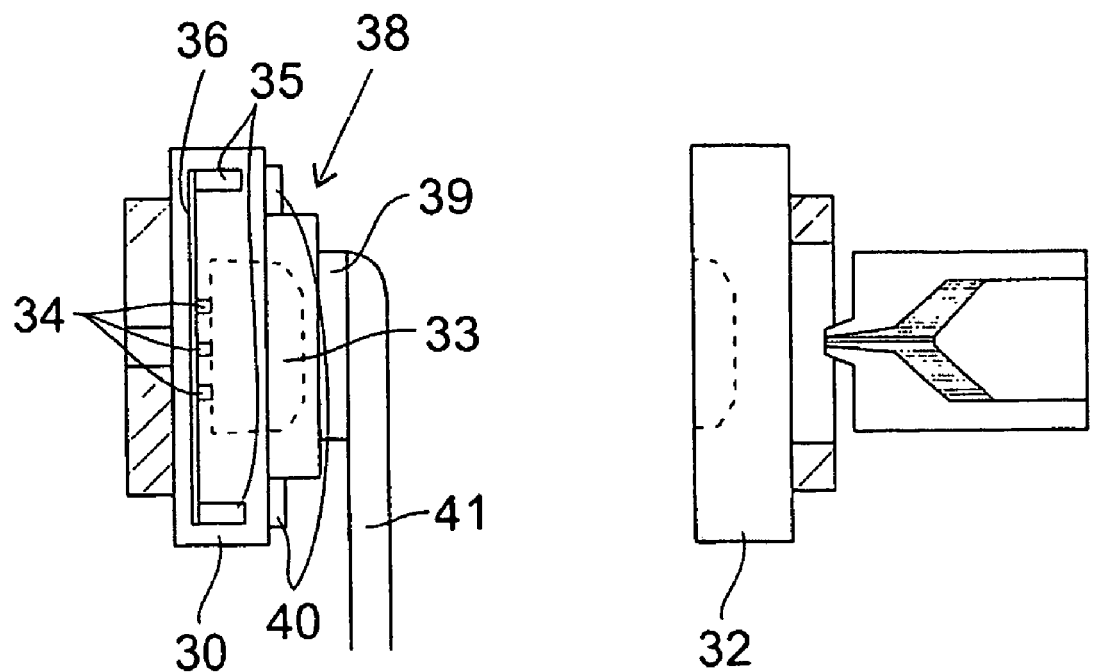
FIG. 4 shows a device according to a second embodiment of the invention in connection with jet moulding.

FIG. 4 shows how a device 38 according to the invention can be used at a jet moulding process in which plastic objects are produced. The casting machine comprises a moulding tool, which has two halves, one movable half 30 and one fixed half 32. In this embodiment example, the movable half 30 is provided with an ejection means for ejecting the device 33 from the moulding tool. The ejection means is arranged movable between a first and a second position, and the movement of the ejection means between the first and the second position ejects the object 33. The ejection means comprises ejection members 34 in the form of pins adapted to be in contact with the object 33 during the ejection and ejector return members 35, in the form of protruding bars, the task of which is to return the ejection means, with the ejection members 34, to the first position. The ejection members and the ejection return members are fastened to a movably arranged plate 34. Another type of ejectors uses pressurized air to eject the object.

A device 38 according to a second embodiment of the invention is arranged for removing objects from the moulding tool and then transporting the objects away from the moulding tool without deforming them. The device 38 comprises a body 39 substantially shaped in the same way as the previously described device 1 according to the first embodiment of the invention. The second embodiment differs from the first embodiment in that a body 39 is provided with one or a plurality of protruding elements 40 arranged on opposite sides of the body 39. The protruding elements 40 are arranged for co-operation with the ejector return members 35 in such a way that the movement of the ejector means is transformed to a traction force on the device 33 through the elements 40 and the body 39. The elements 40 are arranged so that they bear on the ejector return members 35. When the ejector means is moved towards its second position, the ejector return members 35 are moved until they are in contact with the elements 40 and thereby the ejectors 35 apply a force to the elements 40 and thereby also to the body 39 in a direction away from the moulding tool. The device 38 comprises a handling member 41, the object of which is to move the device to and from the moulding tool.

When the moulding tool is closed and fixed, liquid plastic material is pressed into the moulding tool. Cooling occurs in the moulding tool until the object 33 is form-stable, i.e. until the object is stable enough to allow being moved to the device 38. When the object is form-stable, the moulding tool is opened and the device 38 is moved to the movable half 30 of the moulding tool, where the object 33 is, and is docked with the object, so that the surface of the object bears on the contact surface. Thereafter, the object is adhered to the contact surface by an under-pressure created between the object and the contact surface. When the object in such a way has been coupled to the device, the plate 36 is moved until the ejector means 34 is in contact with the object 33 and the ejector return members 35 are in contact with the elements 40. The plate 36 is moved further until it reaches the second position. During this movement, forces are applied to the object 33 from two sides, partly pushing forces from the ejector means 34 and partly a traction force from the device 38 through the ejector return members 38 and the elements 40. Thanks to this co-operation between the forces from the ejector means and the device, the object can be removed without substantially deform the object. When the object has been released from the moulding tool, the handling member 41 moves the device 38 with the object 33 away from the moulding tool 30, 32 to a suitable place outside the casting machine.

Figure 5:
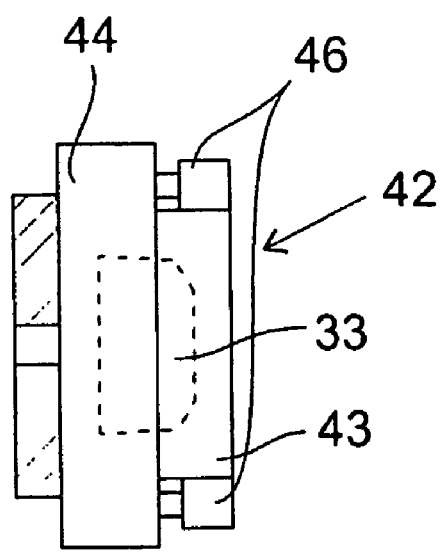
FIG. 5 shows a device according to a third embodiment of the invention.

FIG. 5 shows a device 42 with a body 43 according to a third embodiment of the invention for removing an object 33 from a moulding tool 44. This embodiment differs from the previously described embodiments in that the device 42 comprises push-away members 46 adapted to bear on the moulding tool and to apply a force between the moulding tool 44 and the device 42, which acts separating on them. The push-away members 46 are, for example, cylinders and pistons or screw devices, which, for example, are driven pneumatically, hydraulically or purely mechanically. The device is arranged so that the members 46 apply the separating force between the moulding tool and the device in connection with the object to be removed from the moulding tool. In one embodiment, the moulding tool 44 is fixedly arranged during the removal of the object and the separating force causes the device to move relative to the moulding tool. In another embodiment, the device 42 is fixedly arranged during the removal of the object and the separating force causes the moulding tool to move relative to the device 42.

The invention is not limited to the disclosed embodiments but may be varied and modified within the frame of the following claims. For instance, said means for applying a traction force on the object can be shaped in many different ways. In an alternative embodiment, said means for applying a traction force on the object comprises that the device according to the invention is fixedly arranged relative to the moulding tool which is arranged movable in relation to the device. When a force is applied to the moulding tool in a direction away from the object coupled to the device, this force causes a counteracting force from the device on the object.

There are also alternatives to the use of under-pressure for connecting the object to the device. If the object, for example, has one or more attachments protruding from the side of the object that is turned away from the moulding tool, the coupling means may comprise a stick, which is pushed through those attachments and in such a way couples the object to the device. Alternatively, the coupling means comprises an elongated, thin element, such as a blade or something similar, which is pushed in along the edge of the object, and the object is later pulled out by means of this element.

To counteract deformation, the entire body or at least the section of the body, which is arranged in connection to the contact surface, should be made in an substantially inelastic material. However, in an alternative embodiment, the contact surface can be covered with a thin layer of any elastic material to improve the contact with the object.

The traction force does not have to be entirely opposite the retaining force, but the traction force should at least comprise a component that is opposite the retaining force.

Alternatively, the driving system of the casting machine can be used for achieving the traction force on the object.

The invention claimed is:

1. A device (1, 38, 42) for removing an object from a molding tool (2, 30, 44) in connection with casting or molding an object, wherein there is a retaining force between the molding tool and the object, wherein the device comprises a body (5, 39, 43) designed with a contact surface (9) adapted for at least partly being in contact with the object and coupling means arranged for coupling the object to the body, and wherein the body is provided with means (40, 46) for applying a traction force on the object, which traction force is substantially opposite to said retaining force, wherein said means (40, 46) for applying a traction force on the object is arranged for co-operation with the molding tool (30, 44) for applying the traction force on the object and the coupling means is arranged to couple the object to the contact surface such that said traction force becomes substantially uniformly distributed over the part of the surface of the object that is in contact with the contact surface.

2. The device according to claim 1, wherein the molding tool (30) is provided with ejection means for ejecting the device (33) from the molding tool, and that said means (40) for applying a traction force on the object is arranged for co-operation with the ejection means in such a way that the movement of the ejection means is transformed to a traction force on the device.

3. The device according to claim 1, wherein said means for applying a traction force on the object comprises push-away members (46) adapted to bear on the molding tool and to apply a force between the molding tool and the device, which force acts separating on them.

4. The device according to claim 1, wherein the body comprises at least one section made of an substantially inelastic material and said section being arranged in connection to the contact surface (9).

5. The device according to claim 1, wherein said coupling means is arranged for coupling the object to the contact surface by means of under-pressure and that said coupling means is arranged so that it creates said under-pressure between the contact surface (9) and the object (3).

6. The device according to claim 5, wherein the coupling means comprises sealing means (18) arranged for sealing between the contact surface (9) and the object (3), and at least one coupling channel (13) being arranged in connection to the contact surface (9), wherein the coupling channel is arranged for transporting air away from the contact surface.

7. The device according to any of the claims 5, wherein it comprises at least one air-permeable contact means (17) having a surface, which is at least a part of the contact surface and arranged to be in contact with the object (3) in such a way that deformation of the object is counteracted.

8. The device according to claim 7, wherein the contact means (17) comprises a plurality of elements arranged such that cavities are formed between them, wherein transportation of air is admitted through the contact means.

9. The device according to the claims 7, wherein the contact means (17) is substantially made of a sintered metal or a sintered metal alloy.

10. The device according to any of the claims 5, wherein the contact means (17) is arranged such that transportation of air from the contact surface (9) to the coupling channel (13) occurs through the contact means, and that said sealing means (18) is arranged so that it surrounds the contact means.

* * * * *